United States Patent
Higashinaka

(10) Patent No.: US 9,686,052 B2
(45) Date of Patent: Jun. 20, 2017

(54) COMMUNICATION-LINE-QUALITY ESTIMATING APPARATUS, TRANSMITTER, AND RECEIVER

(71) Applicant: MITSUBISHI ELECTRIC CORPORATION, Chiyoda-ku (JP)

(72) Inventor: Masatsugu Higashinaka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/758,396

(22) PCT Filed: Nov. 18, 2013

(86) PCT No.: PCT/JP2013/081056
§ 371 (c)(1),
(2) Date: Jun. 29, 2015

(87) PCT Pub. No.: WO2014/129031
PCT Pub. Date: Aug. 28, 2014

(65) Prior Publication Data
US 2015/0358128 A1    Dec. 10, 2015

(30) Foreign Application Priority Data

Feb. 20, 2013  (JP) .................................. 2013-031093

(51) Int. Cl.
*H03H 7/30*       (2006.01)
*H04L 1/20*       (2006.01)
(Continued)

(52) U.S. Cl.
CPC ........... *H04L 1/206* (2013.01); *H04B 17/336* (2015.01); *H04L 25/03159* (2013.01);
(Continued)

(58) Field of Classification Search
CPC ......... H04L 25/03038; H04L 25/03133; H04L 25/03019; H04L 25/03057;
(Continued)

(56) References Cited

U.S. PATENT DOCUMENTS 7,623,569 B2   11/2009  Chang et al.
2002/0119781 A1   8/2002  Li et al.
(Continued)

FOREIGN PATENT DOCUMENTS

EP      1 555 761 A1    7/2005
JP      2000-216748 A   8/2000
(Continued)

OTHER PUBLICATIONS

Notice of Rejection issued Nov. 17, 2015 in Japanese Patent Application No. 2015-501271 (with English language translation).
(Continued)

*Primary Examiner* — Zewdu Kassa
(74) *Attorney, Agent, or Firm* — Oblon, McClelland, Maier & Neustadt, L.L.P.

(57) ABSTRACT

A communication-line-quality estimating apparatus of which a receiver receives from a transmitter a signal including known signals whose phase relation is known between the transmitter and the receiver. The communication-line-quality estimating apparatus includes a pilot adding unit that cumulatively adds up and averages a power value of a noise component calculated by addition or subtraction in a specified combination of the known signals, a first power calculating unit, a first averaging processing unit, a second power calculating unit that cumulatively adds up and averages a power value of the known signals, a second averaging processing unit, and a power-ratio calculating unit that estimates communication line quality using a noise signal power value input from the first averaging processing unit (Continued)

and a reception signal power value input from the second averaging processing unit.

8 Claims, 11 Drawing Sheets

(51) Int. Cl.
  *H04L 27/26* (2006.01)
  *H04L 25/03* (2006.01)
  *H04B 17/336* (2015.01)

(52) U.S. Cl.
  CPC ...... *H04L 27/2626* (2013.01); *H04L 27/2647* (2013.01); *H04L 2025/03414* (2013.01)

(58) Field of Classification Search
  CPC ......... H04L 25/03885; H04L 25/03159; H04L 2025/0349; H04L 27/2647; H04L 1/20; H03H 21/0012; H04N 5/4401; H04B 1/30; H04B 1/28
  USPC .......................... 375/232, 231, 229, 316, 295
  See application file for complete search history.

(56) References Cited

U.S. PATENT DOCUMENTS

| | | |
|---|---|---|
| 2002/0147017 A1 | 10/2002 | Li et al. |
| 2004/0264604 A1 | 12/2004 | Malette et al. |
| 2005/0152480 A1 | 7/2005 | Chang et al. |
| 2006/0166634 A1* | 7/2006 | Ido .................. H04B 7/0808 455/277.1 |
| 2006/0251152 A1 | 11/2006 | Li et al. |
| 2007/0281700 A1 | 12/2007 | Deguchi et al. |
| 2012/0014346 A1 | 1/2012 | Deguchi et al. |
| 2012/0087419 A1* | 4/2012 | Khojastepour ...... H04B 7/0684 375/259 |

FOREIGN PATENT DOCUMENTS

| | | |
|---|---|---|
| JP | 2004-529524 A | 9/2004 |
| JP | 4129004 B2 | 7/2008 |
| JP | 2011-139202 A | 7/2011 |
| WO | WO 02/49385 A2 | 6/2002 |

OTHER PUBLICATIONS

International Search Report issued Jan. 14, 2014, in PCT/JP2013/081056, filed Nov. 18, 2013.
Yuanrun Teng, et al., "Proposal of Grouping Adaptive Modulation Method for Burst Mode OFDM Transmission System", IEICE Trans. Commun., vol. E86-B, No. 1, Jan. 2003, pp. 257-265.
Notice of Rejection issued Feb. 9, 2016 in Japanese Patent Application No. 2015-501271 (with English language translation).
Extended Search Report issued Sep. 22, 2016 in European Patent Application No. 13875934.5.

* cited by examiner

SUBCARRIER

OFDM SYMBOL

COMMUNICATION-LINE-QUALITY ESTIMATING APPARATUS, TRANSMITTER, AND RECEIVER

FIELD

The present invention relates to a communication-line-quality estimating apparatus that estimates communication line quality in digital radio communication.

BACKGROUND

For use in transmission power control, control of a transmission mode such as adaptive modulation, and demodulation processing in a receiver, a digital radio communication apparatus typically includes a means for measuring communication line quality such as the SNR (Signal to Noise power Ratio).

As a conventional communication-line-quality estimating technology, for example, a technology regarding OFDM (Orthogonal Frequency Division Multiplexing) is disclosed in Patent Literature 1 described below. Patent Literature 1 describes that known signals are mapped onto subcarriers and an OFDM receiver receives the known signals transmitted between a transmitter and the receiver. Then in the receiver, after modulation components of the known signals are removed, the value of the difference in power between adjacent known signals is established as a noise power estimation value. Subsequently, the estimated noise power estimation value is subtracted from the total reception signal power so as to obtain a desired signal power estimation value. Finally, the ratio of the desired signal power estimation value and the noise power estimation value is calculated to establish the estimated SNR.

CITATION LIST

Patent Literature

Patent Literature 1: Japanese Patent No. 4129004

SUMMARY

Technical Problem

However, with the conventional technology mentioned above, it is necessary to remove the modulation components of the known signals in the receiver. Therefore, there is a problem in that the amount of processing related to estimating the communication line quality increases. The desired signal power estimation value is calculated according to the difference between the total reception signal power and the noise power estimation value. Therefore, there is also a problem in that it is difficult to always obtain the communication line quality estimation with high accuracy regardless of the communication environment.

The present invention has been devised in view of the above and it is an objective of the present invention to obtain a communication-line-quality estimating apparatus capable of using simple processing to accurately estimate communication line quality.

Solution to Problem

In order to solve the problem above and achieve the objective, the present invention relates to a communication-line-quality estimating apparatus of a receiver that receives, from a transmitter, a signal including known signals whose phase relation is known between the transmitter and the receiver. The communication-line-quality estimating apparatus includes: a first power-value calculating unit that cumulatively adds up and averages a power value of a noise component calculated from a specified combination of the known signals; a second power-value calculating unit that cumulatively adds up and averages a power value of the known signals; and a power-ratio calculating unit that estimates communication line quality using a noise signal power value input from the first power-value calculating unit and a reception signal power value input from the second power-value calculating unit.

Advantageous Effects of Invention

The communication-line-quality estimating apparatus according to the present invention attains an effect whereby it is possible to use simple processing to accurately estimate communication line quality.

DESCRIPTION OF EMBODIMENTS

Exemplary embodiments of the present invention are explained in detail below with reference to the drawings. Note that the present invention is not limited to the embodiments.

First Embodiment

Figure 1:
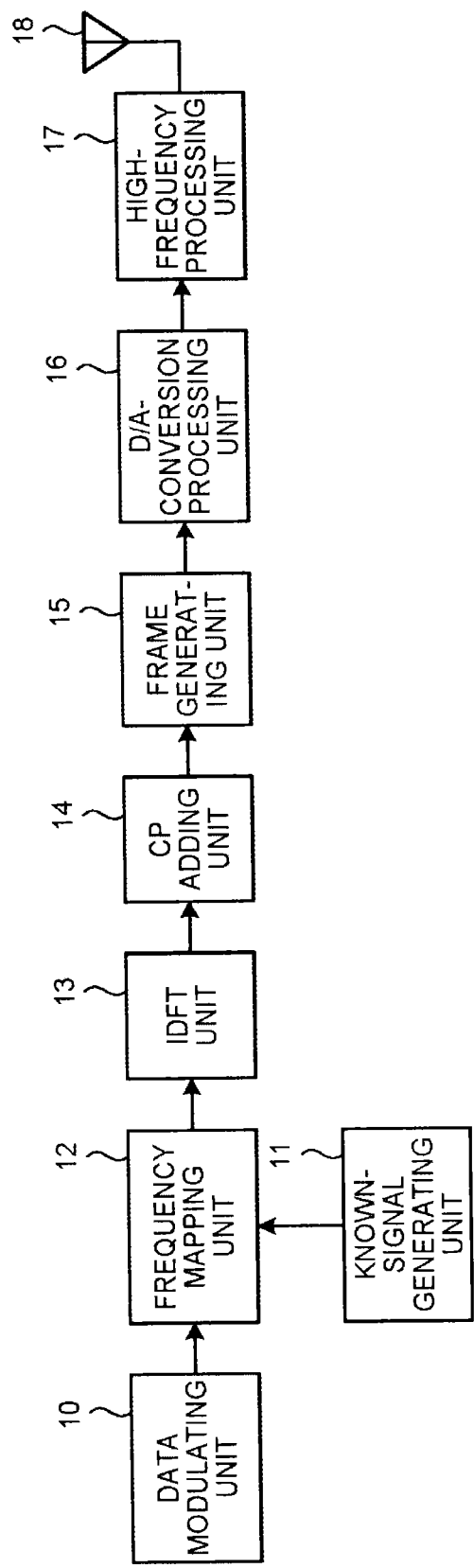
FIG. 1 is a diagram illustrating a configuration example of a transmitter in a first embodiment.

Orthogonal Frequency Division Multiplexing transmission is explained with an example below. FIG. 1 is a diagram illustrating an example of a configuration of a transmitter in this embodiment. The transmitter includes a data modulating unit 10, a known-signal generating unit 11, a frequency mapping unit 12, an IDFT (Inverse Discrete Fourier Transform) unit 13, a CP (Cyclic Prefix) adding unit 14, a frame generating unit 15, a D/A-conversion processing unit 16, a high-frequency processing unit 17, and a transmission antenna 18.

The overall operation of the transmitter is explained with reference to FIG. 1. The transmitter performs, by using the data modulating unit 10, modulation processing to an information bit desired to be transmitted. Any system can be used for the modulation processing. For example, BPSK (Binary Phase Shift Keying) can be used. The known-signal generating unit 11 generates known signals to be used for communication line quality estimation. The frequency mapping unit 12 performs processing in order to allocate data signals input from the data modulating unit 10 and the known signals input from the known-signal generating unit 11 to predetermined subcarriers. The IDFT unit 13 applies IDFT to the signals subjected to the subcarrier allocation by the frequency mapping unit 12 and converts the signals into a signal in a time domain. The CP adding unit 14 performs processing for copying a predetermined number of samples at the end of the signal in the time domain generated by the IDFT unit 13 and adding the predetermined number of copies to the top of the time domain signal. According to a series of processes performed by units up to the CP adding unit 14, an OFDM symbol is generated. The frame generating unit 15 groups, according to a predetermined format, a plurality of OFDM symbols into units called frames. The D/A-conversion processing unit 16 performs processing for converting a digital signal into an analog signal. The high-frequency processing unit 17 carries out predetermined high-frequency signal processing such as up-convert on the analog signal that is converted by the D/A-conversion processing unit 16. Thereafter, the analog signal subjected to the high-frequency signal processing is transmitted from the transmission antenna 18.

Figure 2:
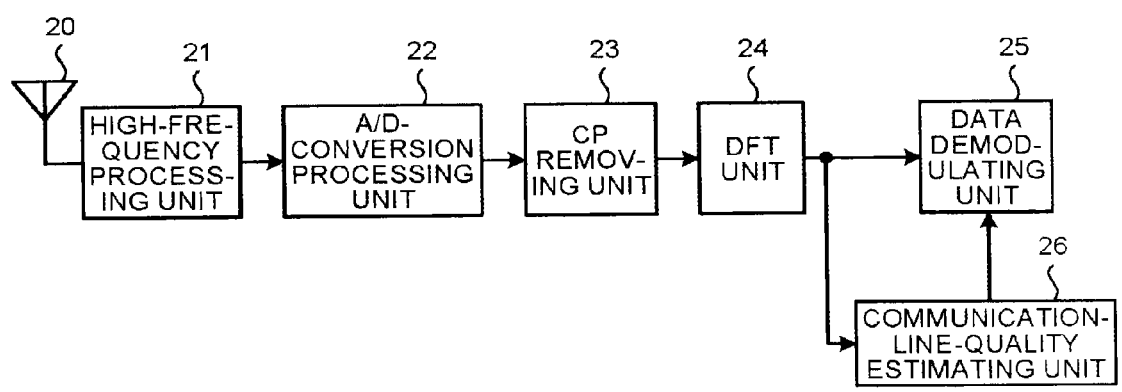
FIG. 2 is a diagram illustrating a configuration example of a receiver in the first embodiment.

FIG. 2 is a diagram illustrating a configuration example of a receiver in this embodiment. The receiver includes a reception antenna 20, a high-frequency processing unit 21, an A/D-conversion processing unit 22, a CP removing unit 23, a DFT (Discrete Fourier Transform) unit 24, a data demodulating unit 25, and a communication-line-quality estimating unit 26.

The overall operation of the receiver is explained with reference to FIG. 2. After predetermined high-frequency signal processing such as a down-convert is carried out on a high-frequency radio signal received by the reception antenna 20 in the high-frequency processing unit 21, the A/D-conversion processing unit 22 converts the high-frequency radio signal into a digital signal. The CP removing unit 23 removes the CP added to the top position of an OFDM symbol. The DFT unit 24 applies DFT to the OFDM symbol from which the CP is removed and converts the OFDM symbol into a reception signal in a frequency domain. The communication-line-quality estimating unit 26 estimates an SNR from the reception signal in the frequency domain. The data demodulating unit 25 demodulates transmission data by using the reception signal in the frequency domain and the SNR estimated by the communication-line-quality estimating unit 26.

Figure 3:
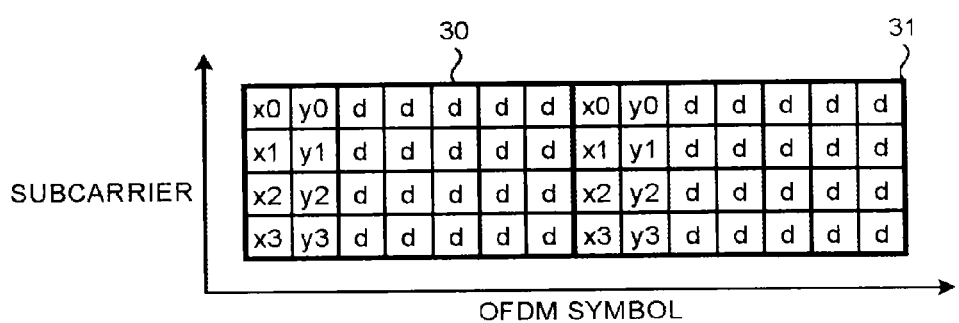
FIG. 3 is a diagram illustrating a frame format of a transmission frame in the first embodiment.

Communication line quality estimation, which is a characteristic part of this embodiment, is explained in detail below. FIG. 3 is a diagram illustrating a frame format of a transmission frame in this embodiment generated by the frame generating unit 15. In FIG. 3, signals for two frames are shown. A frame 30 corresponds to a first frame. A frame 31 corresponds to a second frame. One frame is configured from four subcarriers in a frequency axis direction and seven OFDM symbols in a time axis direction. Concerning the signals in the frames, x0 to x3 and y0 to y3 respectively indicate the known signals generated by the known-signal generating unit 11. Any signal can be used as a known signal as long as the signal satisfies a relation of x0=−y0, x1=−y1, x2=−y2, and x3=−y3. Signals indicated by "d" in the frames are the transmission data generated by the data modulating unit 10.

Figure 4:
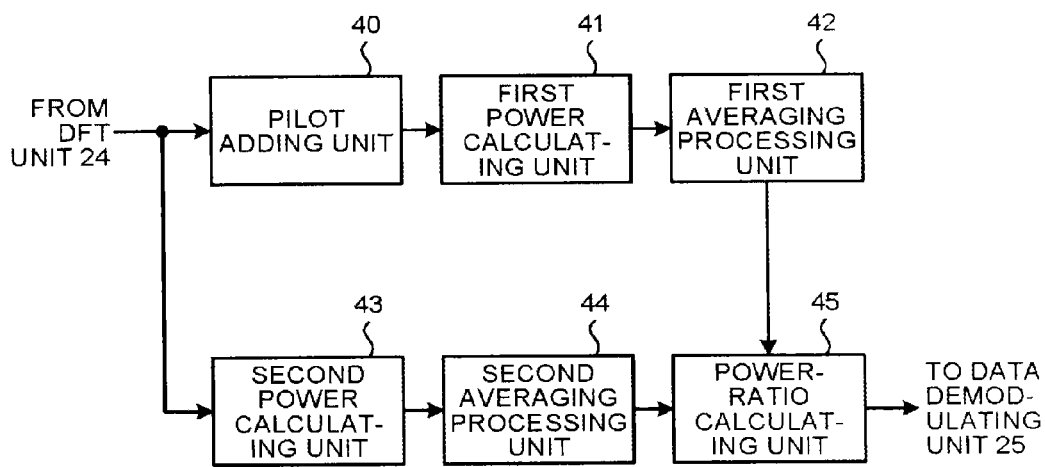
FIG. 4 is a diagram illustrating a configuration example of a communication-line-quality estimating unit in the first embodiment.

FIG. 4 is a diagram illustrating a configuration example of the communication-line-quality estimating unit 26 in this embodiment in the receiver. The communication-line-quality estimating unit 26 includes a pilot adding unit 40, a first power calculating unit 41, a first averaging processing unit 42, a second power calculating unit 43, a second averaging processing unit 44, and a power-ratio calculating unit 45. The reception signal in the frequency domain, which is the output of the DFT unit 24, is input to the pilot adding unit 40 and the second power calculating unit 43. Note that the pilot adding unit 40, the first power calculating unit 41, and the first averaging processing unit 42 are configured as a first power-value calculating unit. The second power calculating unit 43 and the second averaging processing unit 44 are configured as a second power-value calculating unit.

The operation of the communication-line-quality estimating unit 26 is explained using, as an example, transmission and reception of the signals of the frame format illustrated in FIG. 3. Note that, for convenience of explanation, OFDM symbols onto which x0 to x3 and y0 to y3 are mapped are respectively referred to as a leading pilot OFDM symbol and a second pilot OFDM symbol. The communication-line-quality estimating unit 26 in this embodiment operates only with the pilot OFDM symbols and does not operate with OFDM symbols onto which transmission data is mapped.

Upon receiving the reception signal in the frequency domain, the pilot adding unit 40 performs processing for, when the leading pilot OFDM symbol is received, directly accumulating the signal; and when the second pilot OFDM symbol is received, it performs processing for adding, for each subcarrier, the second pilot OFDM symbol to the accumulated leading pilot OFDM symbol. As explained above, the known signals transmitted in the pilot OFDM symbols are related thus x0=−y0, x1=−y1, x2=−y2, and x3=−y3. Therefore, known signal components are cancelled by the processing of the pilot adding unit 40. As a result, only noise components other than a desired signal remain. The pilot adding unit 40 outputs a processing result to the first power calculating unit 41.

After calculating, for each subcarrier, a power value of a signal input from the pilot adding unit 40, the first power calculating unit 41 cumulatively adds up power values for one OFDM symbol. The first power calculating unit 41 outputs the calculated power value to the first averaging processing unit 42.

The first averaging processing unit 42 averages, over a plurality of frames, the power value input from the first power calculating unit 41. The averaging method used is not limited to any particular method. There is, for example, a method of calculating an arithmetic mean that uses a predetermined number of averaging frames. The first averaging processing unit 42 outputs the averaged power value to the power-ratio calculating unit 45.

The second power calculating unit 43 calculates a power value for each pilot OFDM symbol with respect to the reception signal in the frequency domain. The second power calculating unit 43 outputs the calculated power value to the second averaging processing unit 44.

The second averaging processing unit 44 carries out, over a plurality of OFDM symbols and a plurality of frames, averaging processing on the power value of the pilot OFDM symbol input from the second power calculating unit 43. As in the first averaging processing unit 42, any method can be applied as the averaging method. The second averaging processing unit 44 outputs the averaged power value of the pilot OFDM symbol to the power-ratio calculating unit 45.

The power-ratio calculating unit 45 calculates, as indicated by Expression (1) described below, a ratio (hereinafter represented as z) of the power value of the noise signal (hereinafter represented as $\alpha$) input from the first averaging processing unit 42 to the power value of the reception signal (hereinafter represented as $\beta$) input from the second averaging processing unit 44.

$$z = (\beta - \alpha \times 0.5)/(\alpha \times 0.5) \tag{1}$$

In the expression, the coefficient 0.5 multiplied by $\alpha$ is introduced to cancel out noise components because the noise components are doubled by the processing that adds up the pilot OFDM symbols in the pilot adding unit 40. The SNR is calculated using Expression (1). The power-ratio calculating unit 45 outputs the calculated SNR to the data demodulating unit 25. The SNR is used for predetermined demodulation processing in the data demodulating unit 25.

In this embodiment, the transmitter includes a transmitting unit that transmits a signal including known signals to the receiver when the receiver, which receives the known signals whose phase relation is known between the transmitter and the receiver, estimates communication line quality using power values of noise components calculated by addition or subtraction of a combination of the known signals. The communication-line-quality estimating unit 26, which is a communication-line-quality estimating device of the receiver that receives the signal from the transmitter, cumulatively adds up and averages power values of noise components calculated from a specified combination of known signals; cumulatively adds up and averages power values of the known signals; and estimates communication line quality using the averaged two power values. At this point, in the receiver, it is unnecessary to perform a process of multiplying a reception signal with an inverse modulation component of a known pilot signal in order to remove a pilot component.

As explained above, in this embodiment, the transmitter is configured to generate the pilot OFDM symbol using the known signals whose phase relation is an anti-phase such as $x0 = -y0$, $x1 = -y1$, $x2 = -y2$, and $x3 = -y3$. The receiver is configured to add up the anti-phase known signals to remove known signal components and carry out noise power estimation. Consequently, it is possible to realize communication line quality estimation with simple processing without performing processing for removing modulation components of the known signals in the receiver.

Note that, in this embodiment, the anti-phase signals are used as the known signals configuring the pilot OFDM symbol. However, the known signals are not limited to the anti-phase signals as long as the phase relation is known. For example, the same effects can be realized if the subtraction of the pilot OFDM symbols is performed in the pilot adding unit 40.

In this embodiment, each of x0 to x3 and y0 to y3 is allocated to one pilot OFDM symbol. However, this combination can be any configuration. For example, x0, y0, x1, and y1 can be allocated to the leading pilot OFDM symbol and x2, y2, x3, and y3 can be allocated to the second pilot OFDM symbol. In this case, when the leading pilot OFDM symbol is processed, the pilot adding unit 40 executes addition processing in a subcarrier direction in the leading pilot OFDM symbol such that $x0+y0$ and $x1+y1$ are calculated. Similarly, at the time when the second pilot OFDM symbol is processed, the pilot adding unit 40 executes the addition processing in the subcarrier direction such that $x2+y2$ and $x3+y3$ are calculated. With such a configuration, it is possible to obtain an effect that a processing delay due to signal accumulation, which occurs when the leading pilot OFDM symbol is processed, does not occur. Further, an arrangement pattern of signals whose phase relation is known does not always need to be allocated to adjacent subcarriers and adjacent OFDM symbols and can be set in any place. In this case, the pilot adding unit 40 only has to appropriately select signals whose phase relation is known and perform the addition processing.

In this embodiment, a frame configuration is adopted such that a pilot OFDM symbol, in which one OFDM symbol is configured only from known signals, and an OFDM symbol, which is configured only from transmission data, are time-multiplexed. However, a configuration can be adopted in which the known signals and the transmission data are allocated to different subcarriers of the same OFDM symbol. In this case, the communication-line-quality estimating unit 26 executes its processing only on subcarriers onto which the known signals are mapped. When such a configuration is used, the pilot OFDM symbols are not intermittently inserted as illustrated in FIG. 3, but the known signals can be temporally continuously inserted. Therefore, it is possible to obtain an effect whereby it is easy to follow the fluctuations in the communication environment.

In this embodiment, the pilot adding unit 40 is configured to perform an addition for each subcarrier between the leading pilot OFDM symbol and the second pilot OFDM symbol in the same frame. However, the present invention is not limited to this. For example, the pilot adding unit 40 can be configured to perform addition between a second pilot OFDM symbol of a leading frame and a leading pilot OFDM symbol of a second frame. In this case, because the number of symbols for calculating noise signal power increases, it is possible to accurately estimate communication line quality.

In this embodiment, the SNR with respect to the total bandwidth occupied by the OFDM symbols is calculated as the communication line quality. However, the SNR per subcarrier, for example, can also be calculated. In this case, $\alpha$ and $\beta$ used in Expression (1) only have to be changed from the power values per one OFDM symbol to power values per subcarrier.

In this embodiment, the communication-line-quality estimating unit 26 is configured to perform the communication line quality estimation by using the reception signal in the frequency domain input from the DFT unit 24. However, the communication-line-quality estimating unit 26 is not limited to this configuration. For example, the communication-line-quality estimating unit 26 can be configured to use time domain signals before processing using a DFT is performed. In this case, the known signals only have to be designed such that portions in which signals to be added up by the pilot adding unit 40 are in anti-phase to each other are included in the time domain signals. The communication-line-quality estimating unit 26 can be configured to execute the processing of the second power calculating unit 43 by using the time domain signals and execute the processing done by the pilot adding unit 40 and the first power calculating unit 41 by using the frequency domain signals. The communication-line-quality estimating unit 26 can also be configured such that its configuration is the opposite of the above.

In this embodiment, in order to estimate the desired signal power, the estimated noise power value is subtracted from the total power value of the pilot OFDM symbol. However, the estimated noise power value can be subtracted from the total power value of the OFDM symbols onto which the transmission data is mapped. In this case, when a transmission power ratio of the pilot OFDM symbols and the OFDM symbols onto which the transmission data is mapped are known in advance, the communication-line-quality estimating unit 26 only has to perform the averaging operation by taking the power ratio into account. With such a configuration, it is possible to estimate the desired signal power by also using the OFDM symbols onto which the transmission data is mapped, and therefore an improvement can be expected in the estimation accuracy of communication line quality.

Second Embodiment

A plurality of OFDM symbols is arranged in one frame to determine whether it is necessary to carry out communication line quality estimation as appropriate. Differences from the first embodiment are explained.

Figure 5:
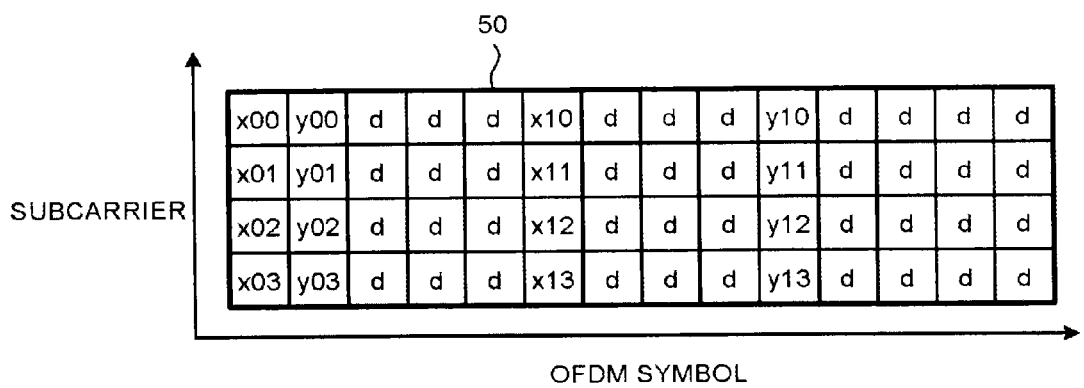
FIG. 5 is a diagram illustrating a frame format of a transmission frame in a second embodiment.

FIG. 5 is a diagram illustrating a frame format of a transmission frame in this embodiment generated by the frame generating unit 15. In FIG. 5, a frame 50 indicates one frame in this embodiment. In this embodiment, a leading OFDM symbol, a second OFDM symbol, a sixth OFDM symbol, and a tenth OFDM symbol in the frame are pilot OFDM symbols. The other part of the frame is configured from transmission data. Known signals are generated by the known-signal generating unit 11 such that a relation holds in which $x00=-y00=x10=-y10$, $x01=-y01=x11=-y11$, $x02=-y02=x12=-y12$, and $x03=-y03=x13=-y13$. An OFDM symbol to which x00 to x03 are allocated is referred to as a leading pilot OFDM symbol; an OFDM symbol to which y00 to y03 are allocated is referred to as a second pilot OFDM symbol; an OFDM symbol to which x10 to x13 are allocated is referred to as a third pilot OFDM symbol; and an OFDM symbol to which y10 to y13 are allocated is referred to as a fourth pilot OFDM symbol, respectively.

Figure 6:
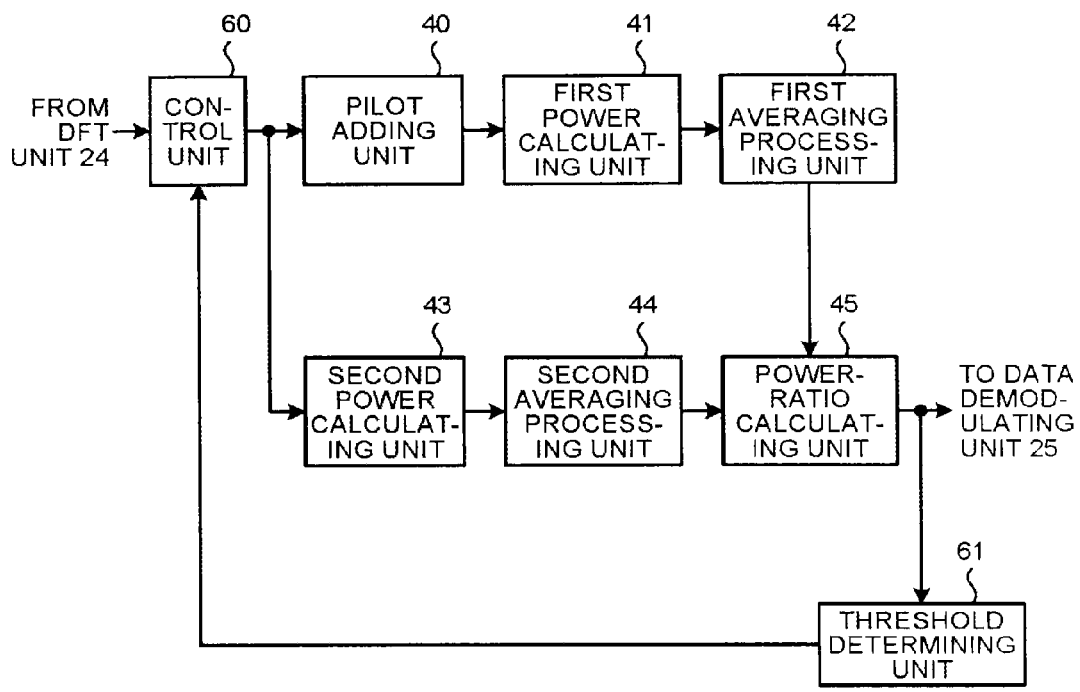
FIG. 6 is a diagram illustrating a configuration example of a communication-line-quality estimating unit in the second embodiment.

FIG. 6 is a diagram illustrating a configuration example of the communication-line-quality estimating unit 26 in this embodiment in a receiver. Note that, in FIG. 6, components having functions that are the same as the functions of the components illustrated in FIG. 4 are denoted by the same reference numerals and an explanation of these components is omitted. The communication-line-quality estimating unit 26 includes the pilot adding unit 40, the first power calculating unit 41, the first averaging processing unit 42, the second power calculating unit 43, the second averaging processing unit 44, the power-ratio calculating unit 45, a control unit 60, and a threshold determining unit 61. A reception signal in a frequency domain, which is an output of the DFT unit 24, is input to the pilot adding unit 40 and the second power calculating unit 43 via the control unit 60.

The control unit 60 and the threshold determining unit 61 carry out processing for comparing an estimated SNR value with a predetermined condition so as to determine whether communication line quality estimation is carried out. The following explanation focuses on the operations of the control unit 60 and the threshold determining unit 61.

When the leading pilot OFDM symbol and the second pilot OFDM symbol are processed, the control unit 60 directly outputs the input reception signal in the frequency domain to the pilot adding unit 40 and the second power calculating unit 43 and then it performs the communication line quality estimation using the method explained in the first embodiment. The power-ratio calculating unit 45 outputs a calculated SNR to the data demodulating unit 25 and the threshold determining unit 61.

The threshold determining unit 61 compares the input SNR with a determination threshold in order to determine whether the communication line quality estimation is to be ended or continued. When the SNR is larger than the determination threshold, the threshold determining unit 61 deteLmines that communication line quality is satisfactory and outputs a signal notifying the control unit 60 of the ending of the communication line quality estimation. When the SNR is smaller than the determination threshold, the threshold determining unit 61 determines that the communication line quality is poor and outputs a signal notifying the control unit 60 of the continuation of the communication line quality estimation.

When the third pilot OFDM symbol is being processed, and when the control unit 60 receives the signal notifying the threshold determining unit 61 of the ending of the communication line quality estimation, the control unit 60 does not output the reception signal in the frequency domain to the pilot adding unit 40 and the second power calculating unit 43, but it does control the communication-line-quality estimating unit such that it does not perform SNR estimation. In contrast, when the control unit 60 receives the signal notifying it of the continuation of the communication line quality estimation from the threshold determining unit 61, the control unit 60 outputs the reception signal in the frequency domain to the pilot adding unit 40 and the second power calculating unit 43 and it carries out the communication line quality estimation. At this point, the pilot adding unit 40 adds up the second pilot OFDM symbol and the third pilot OFDM symbol and continues the processing.

In this way, when the pilot adding unit 40 calculates power values of noise components using a first combination of the pilot OFDM symbols whose phase relation is known (the leading pilot OFDM symbol and the second pilot OFDM symbol), and when the threshold determining unit 61 determines whether to end or continue the communication line quality estimation, the control unit 60 controls the output of the pilot OFDM symbols whose phase relation is known of second and subsequent combinations (the third and subsequent pilot OFDM symbols).

As explained above, in this embodiment, on the basis of the communication line quality estimated using the leading pilot OFDM symbol and the second pilot OFDM symbol, it is determined whether the communication line quality estimation is carried out on the following pilot OFDM symbols in the frame. This is because, under a condition in which the communication line quality is satisfactory, it can be expected that the communication line quality is estimated at high accuracy even if the number of pilot OFDM symbols used for the communication line quality estimation is relatively small, and, under conditions in which the communication line quality is poor, a large number of pilot OFDM symbols are considered to be necessary to improve the communication line quality estimation accuracy. Consequently, it is possible to control, according to actual communication line quality, the number of pilot OFDM symbols used for the communication line quality estimation. As a result, it is possible to expect a processing amount reduction effect of the receiver while suppressing deterioration in estimation accuracy.

Note that, in this embodiment, the threshold determining unit 61 is configured to establish the determination threshold with respect to the SNR. However, a parameter for determining the operation of the threshold determining unit 61 is not limited to this. For example, the threshold determining unit 61 can be configured to also take into account a residual frequency offset amount remaining in the reception signal in the frequency domain, and, when the frequency offset is large and the SNR is high, not use the third and fourth pilot OFDM symbols. In the frame configuration illustrated in FIG. 5, because an interval among the second to fourth pilot OFDM symbols is wide, in a situation in which frequency offset is present, known signal components cannot be completely removed by processing performed by the pilot adding unit 40 and it is likely that the estimation accuracy deteriorates. This effect appears more conspicuously as the communication line quality becomes more satisfactory. Therefore, it is possible to avoid the communication line quality estimation accuracy deterioration by configuring the threshold determining unit 61 to switch the operation by taking into account the SNR and the frequency offset.

In this embodiment, the frame configuration illustrated in FIG. 5 is applied. However, just like in the first embodiment, the frame configuration is not limited. For example, a larger number of pilot OFDM symbols can be arranged at the frame top and the pilot OFDM symbols can be arranged at a wider interval on the inside of the frame.

Third Embodiment

In this embodiment, communication line quality is estimated using a transmission line estimation result. Differences from the first embodiment are explained.

Figure 7:
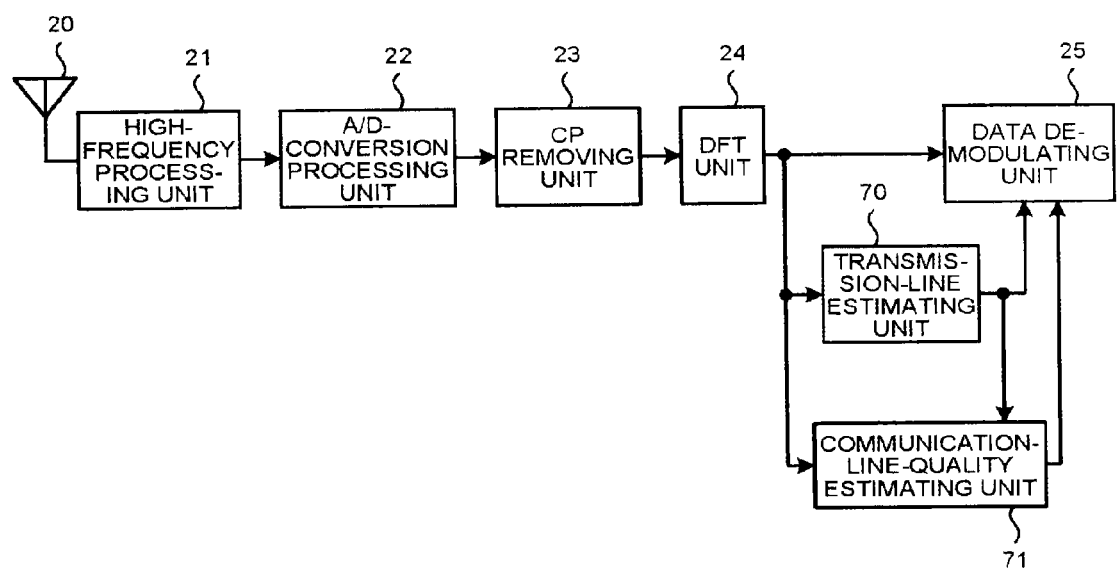
FIG. 7 is a diagram illustrating an example of a configuration of a receiver in a third embodiment.

FIG. 7 is a diagram illustrating a configuration example of a receiver in this embodiment. Note that, in FIG. 7, components having functions that are the same as the functions of the components illustrated in FIG. 2 are denoted by the same reference numeral and explanations of these components are omitted. The receiver includes the reception antenna 20, the high-frequency processing unit 21, the A/D-conversion processing unit 22, the CP removing unit 23, the DFT unit 24, the data demodulating unit 25, a transmission-line estimating unit 70, and a communication-line-quality estimating unit 71. A reception signal in a frequency domain that is a processing result of the DFT unit 24 is input to the data demodulating unit 25, the transmission-line estimating unit 70, and the communication-line-quality estimating unit 71.

The transmission-line estimating unit 70 estimates a response of a radio transmission line between a transmitter and the receiver necessary for demodulation processing in the data demodulating unit 25. As an estimation method for a radio transmission line response applied by the transmission-line estimating unit 70, for example, a method is widely known of comparing a known signal received for each subcarrier in a pilot OFDM symbol to a replica of the known signal retained in advance in the receiver to estimate waveform distortion received in the radio transmission line. Such a general method is applicable to the embodiment. In the following explanation, it is assumed that a frequency transfer function for each subcarrier is estimated as the transmission line estimation result in the transmission-line estimating unit 70. The transmission-line estimating unit 70 outputs the transmission line estimation result to the data demodulating unit 25 and the communication-line-quality estimating unit 71. The transmission line estimation result is used for data demodulation processing in the data demodulating unit 25 and used for communication line quality estimation in the communication-line-quality estimating unit 71.

Figure 8:
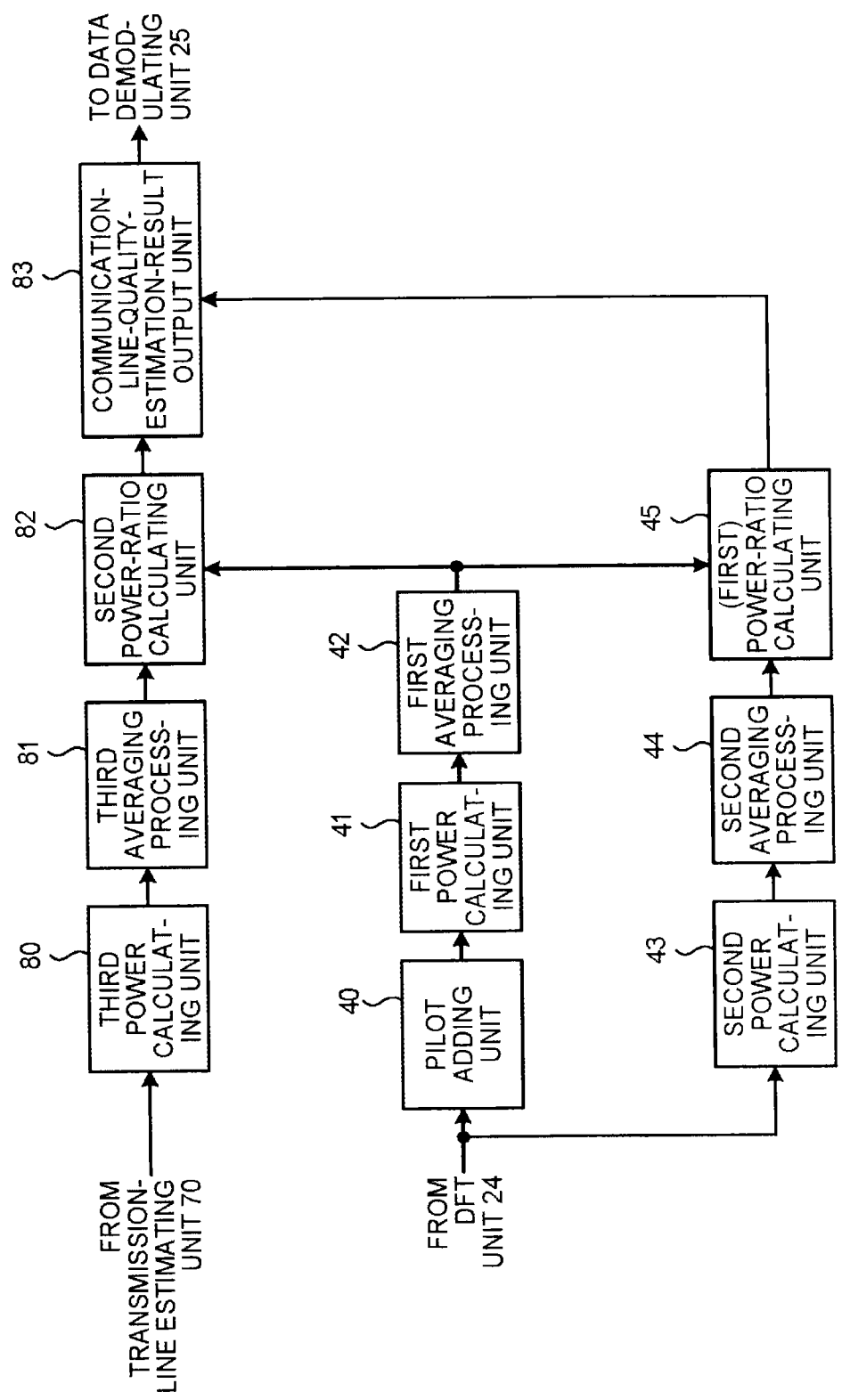
FIG. 8 is a diagram illustrating an example of a configuration of a communication-line-quality estimating unit in the third embodiment.

FIG. 8 is a diagram illustrating a configuration example of the communication-line-quality estimating unit 71 in this embodiment in the receiver. Note that, in FIG. 8, components having functions that are the same as the functions of the components illustrated in FIG. 4 are denoted by the same reference numerals and explanations of these components are omitted. The communication-line-quality estimating unit 71 includes the pilot adding unit 40, the first power calculating unit 41, the first averaging processing unit 42, the second power calculating unit 43, the second averaging processing unit 44, the (first) power-ratio calculating unit 45, a third power calculating unit 80, a third averaging processing unit 81, a second power-ratio calculating unit 82, and a communication-line-quality-estimation-result output unit 83. The transmission line estimation result, which is an output of the transmission-line estimating unit 70, is input to the third power calculating unit 80. The reception signal in the frequency domain, which is an output of the DFT unit 24, is input to the pilot adding unit 40 and the second power calculating unit 43. Note that the third power calculating unit 80 and the third averaging processing unit 81 are configured as a third power-value calculating unit.

The third power calculating unit 80 calculates a power value for each subcarrier with respect to an input frequency transfer function for each subcarrier and, after cumulatively adding up power values for one OFDM symbol, it outputs the calculated power value to the third averaging processing unit 81.

The third averaging processing unit 81 averages the input power value. Any method such as an arithmetic mean can be used as an averaging method. An averaged result is output to the second power-ratio calculating unit 82.

Further, the units from the pilot adding unit 40 to the (first) power-ratio calculating unit 45 execute processing the same as the processing in the first embodiment and calculate an SNR. The first averaging processing unit 42 outputs a processing result to the second power-ratio calculating unit 82 in addition to the (first) power-ratio calculating unit 45. The (first) power-ratio calculating unit 45 outputs the processing result to the communication-line-quality-estimation-result output unit 83.

The second power-ratio calculating unit 82 calculates, as indicated by Expression (2) described below, a ratio (hereinafter represented as y) of a power value (hereinafter represented as γ) of the transmission line estimation result that is input from the third averaging processing unit 81 to a power value α of a noise signal that is input from the first averaging processing unit 42.

$$y=\gamma/(\alpha \times 0.5) \qquad (2)$$

The second power-ratio calculating unit 82 outputs the calculated power ratio y to the communication-line-quality-estimation-result output unit 83.

The communication-line-quality-estimation-result output unit 83 compares the power ratio y input from the second power-ratio calculating unit 82 with a predetermined selection threshold. When the power ratio y is smaller than the selection threshold, the communication-line-quality-estimation-result output unit 83 outputs the power ratio y. When the power ratio y is larger than the selection threshold, the communication-line-quality-estimation-result output unit 83 outputs the power ratio z that is input from the (first) power-ratio calculating unit 45. That is, the communication-line-quality-estimation-result output unit 83 controls, according to a calculation result of the power value y, the communication line quality estimation value that is output from the communication-line-quality estimating unit 71 and that is switched according to the power ratio y and the power ratio z.

The communication-line-quality estimating unit 71 outputs the communication line quality estimation value to the data demodulating unit 25. The communication line quality estimation value output from the communication-line-quality estimating unit 71 is used for data demodulation processing in the data demodulating unit 25.

As explained above, in this embodiment, compared with the first embodiment already explained, the communication-line-quality estimating unit is configured to be capable of calculating the power ratio y using the power value of the transmission line estimation result estimated by the transmission-line estimating unit 70. Further, the communication-line-quality estimating unit is configured to be capable of switching the power ratio y and the power ratio z as the output of the communication-line-quality estimating unit according to the result of the comparison of the power ratio y and the predetermined selection threshold. In general, in a communication environment in which the SNR is extremely low, by using the power-ratio calculating method of Expression (1) expressed in the first embodiment, the SNR sometimes cannot be calculated to a satisfactory accuracy. By using the configuration of this embodiment, the SNR can be calculated using two different criteria. Therefore, it is possible to provide a satisfactory communication-line-quality estimating means with respect to a wide range of SNRs regardless of the actual communication environment.

In this embodiment, the communication-line-quality-estimation-result output unit 83 is configured to compare the power ratio y with the selection threshold. However, the communication-line-quality-estimation-result output unit 83 can be configured to compare the power ratio z with the selection threshold. The configuration illustrated in the second embodiment and the configuration illustrated in the third embodiment can be combined.

The communication-line-quality-estimation-result output unit 83 can be further configured to multiply the power ratio y and the power ratio z respectively calculated by the power-ratio calculating unit 45 and the second power-ratio calculating unit 82 with a correction coefficient. With such a configuration, for example, when a fixed error occurs in the power value of the transmission line estimation result estimated by the transmission-line estimating unit 70, it is possible to remove an error amount from the communication line quality estimation result and maintain satisfactory estimation accuracy.

In this embodiment, the communication-line-quality-estimation-result output unit 83 is configured to switch the power ratio y and the power ratio z according to conditions. However, for example, the power ratio y and the power ratio z can be weighted and combined according to a result of the threshold determination so as to use it as the communication line quality estimation result. Further, a plurality of selection thresholds can be prepared to provide conditional branches such as an output of the power ratio y, a weighted combination of the power ratio y and the power ratio z to be output, and an output of the power ratio z.

The communication-line-quality-estimation-result output unit 83 can use any method as a weighted combination method. For example, simple averaging such as $(y \pm z)/2$ can be used. By adopting the weighted combination, it is possible to realize highly accurate communication line quality estimation with the use of the estimation results of both the power ratio y and the power ratio z. Further, it can be configured such that the communication line quality estimation uses only the power ratio y without calculating the power ratio z. With such a configuration, when communication is performed only in an extremely low SNR environment in which sufficient estimation accuracy cannot be ensured at the power ratio z, it is possible to expect an effect whereby satisfactory estimation accuracy can be realized with a simple configuration.

The details of the present invention are illustrated above. However, the scope of the present invention is not limited to the embodiments explained above. All conceivable configurations are included in the scope.

Fourth Embodiment

In this embodiment, a transmitter transmits a signal in which, with regard to a symbol in a time domain, a sample in a predetermined sample position in the symbol holds a fixed phase for each symbol. A receiver calculates a difference in the sample between the symbols in order to carry out noise power estimation. Differences from the first embodiment are explained below.

Figure 9:
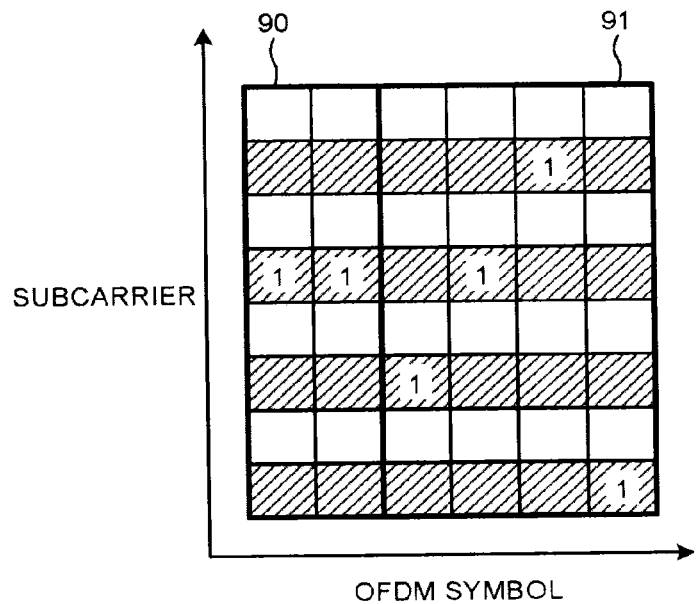
FIG. 9 is a diagram illustrating a frame configuration and a transmission method of a signal in a fourth embodiment.

FIG. 9 is a diagram illustrating a frame configuration and a transmission method of a signal in this embodiment. A frame format of a transmission frame transmitted from the transmitter is illustrated in FIG. 9, and signals for one frame are shown. The transmission frame is configured from pilot symbols 90 in a two-symbol arrangement and data symbols 91 in a four-symbol arrangement. In FIG. 9, each symbol includes eight subcarriers.

In this embodiment, a plurality of transmittable subcarriers is established from all the subcarriers. These subcarriers are defined as a subcarrier set. In FIG. 9, the subcarriers indicated by hatching (first, third, fifth, and seventh subcarriers) are the subcarrier set. The subcarriers configuring the subcarrier set are selected so as to be arranged at equal intervals to each other.

The transmitter selects, in a pilot symbol, a subcarrier selected in advance from the subcarrier set and transmits the subcarrier; and then it selects a subcarrier out of the subcarrier set in a data symbol according to an information bit and transmits the subcarrier. In FIG. 9, the subcarrier selected in each symbol is represented by "1". Note that the same subcarrier is selected for the pilot symbols of two symbols.

Figure 10:
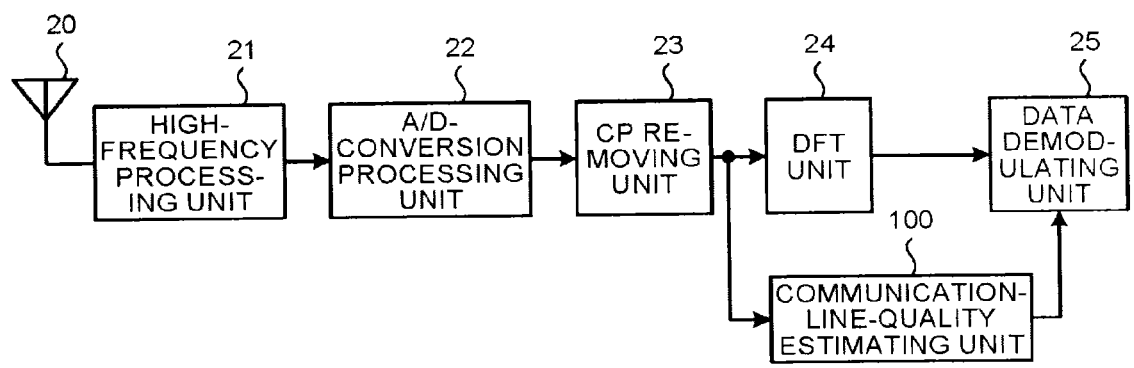
FIG. 10 is a diagram illustrating a configuration example of a receiver in the fourth embodiment.

FIG. 10 is a diagram illustrating a configuration example of the receiver in this embodiment. The receiver includes the reception antenna 20, the high-frequency processing unit 21, the A/D-conversion processing unit 22, the CP removing unit 23, the DFT unit 24, the data demodulating unit 25, and a communication-line-quality estimating unit 100. In this embodiment, the communication-line-quality estimating unit 100 performs processing of communication line quality estimation using the symbol in the time domain input from the CP removing unit 23 and outputs a processing result to the data demodulating unit 25.

Figure 11:
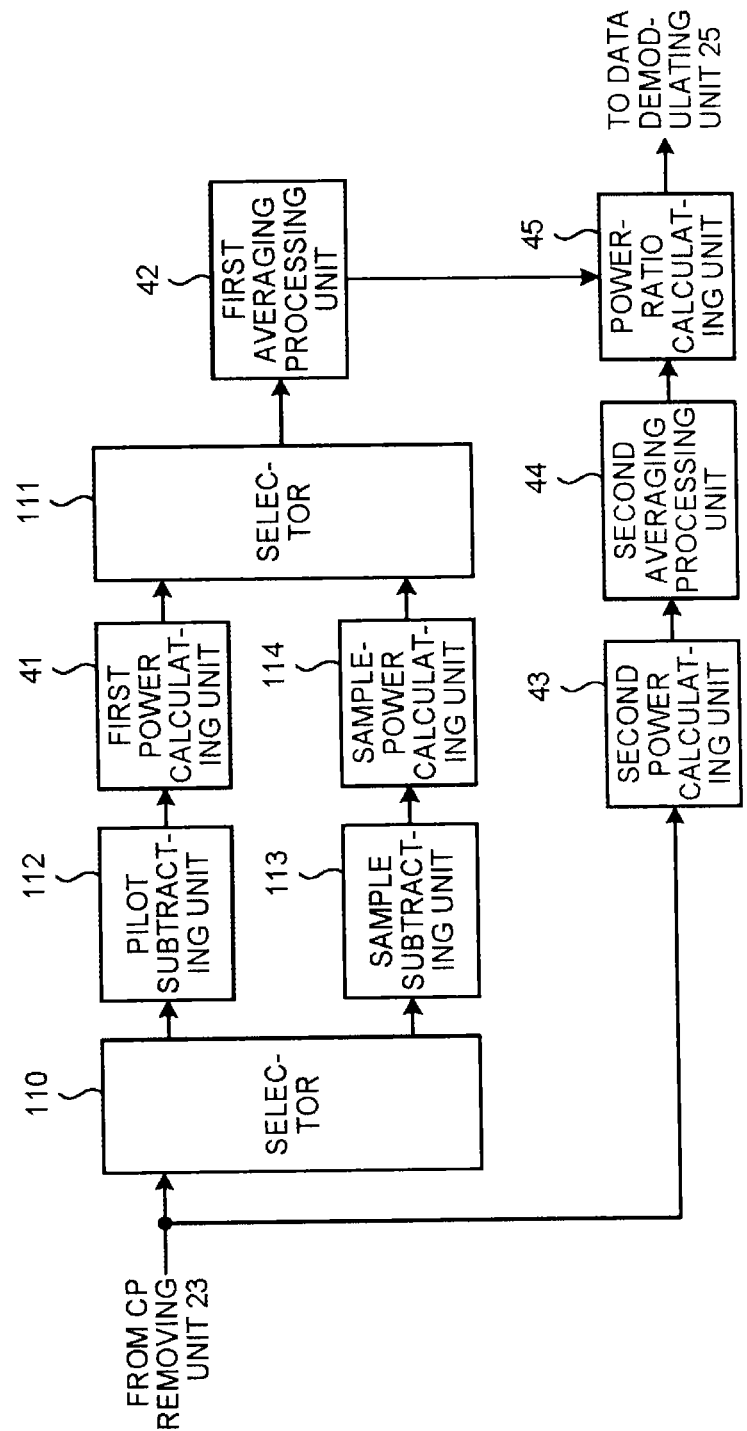
FIG. 11 is a diagram illustrating a configuration example of a communication-line-quality estimating unit in the fourth embodiment.

The operation of the communication-line-quality estimating unit 100 is explained here. FIG. 11 is a diagram illustrating a configuration example of the communication-line-quality estimating unit 100 in this embodiment. The communication-line-quality estimating unit 100 includes the first power calculating unit 41, the first averaging processing unit 42, the second power calculating unit 43, the second averaging processing unit 44, the power-ratio calculating unit 45, selectors 110 and 111, a pilot subtracting unit 112, a sample subtracting unit 113, and a sample-power calculating unit 114. Note that the selector 110, the pilot subtracting unit 112, the first power calculating unit 41, the sample subtracting unit 113, the sample-power calculating unit 114, the selector 111 and the first averaging processing unit 42 are configured as a first power-value calculating unit. The second power-calculating unit 43 and the second averaging processing unit 44 are configured as a second power-value calculating unit.

The selector 110 performs a process to switch a signal route through which the symbol in the time domain received from the CP removing unit 23 is output. Specifically, the selector 110 outputs the symbol in the time domain to the pilot subtracting unit 112 when the pilot symbol is processed, and it outputs the symbol in the time domain to the sample subtracting unit 113 when the data symbol is processed.

The pilot subtracting unit 112 performs a process to directly accumulate a signal when a leading pilot symbol is processed and of subtracting when a second pilot symbol is processed; and it then performs a process of subtracting the second pilot symbol from the accumulated leading pilot symbol between the same sample times. The pilot subtracting unit 112 outputs a calculation result of the subtraction to the first power calculating unit 41.

After calculating a power value for each sample with respect to the subtraction result for each sample input from the pilot subtracting unit 112, the first power calculating unit 41 cumulatively adds the power values for one symbol and outputs the calculated power value to the selector 111.

Figure 12:
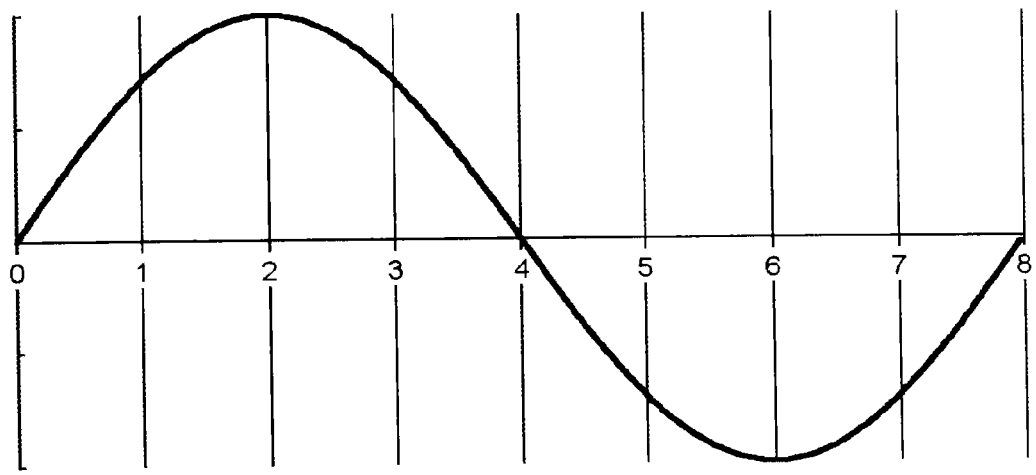
FIG. 12 is a diagram illustrating a symbol in a time domain when a subcarrier number 1 is used.
Figure 13:
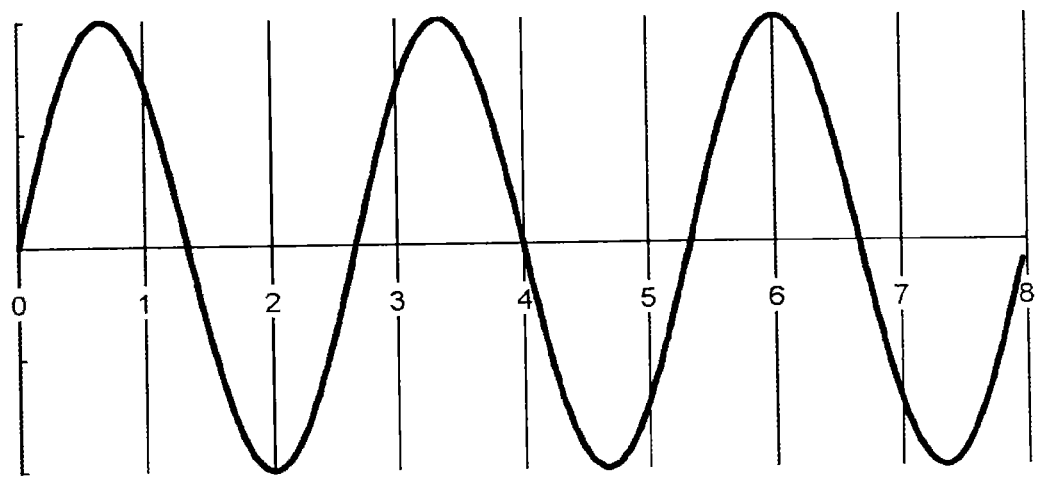
FIG. 13 is a diagram illustrating the symbol in the time domain when a subcarrier number 3 is used.
Figure 14:
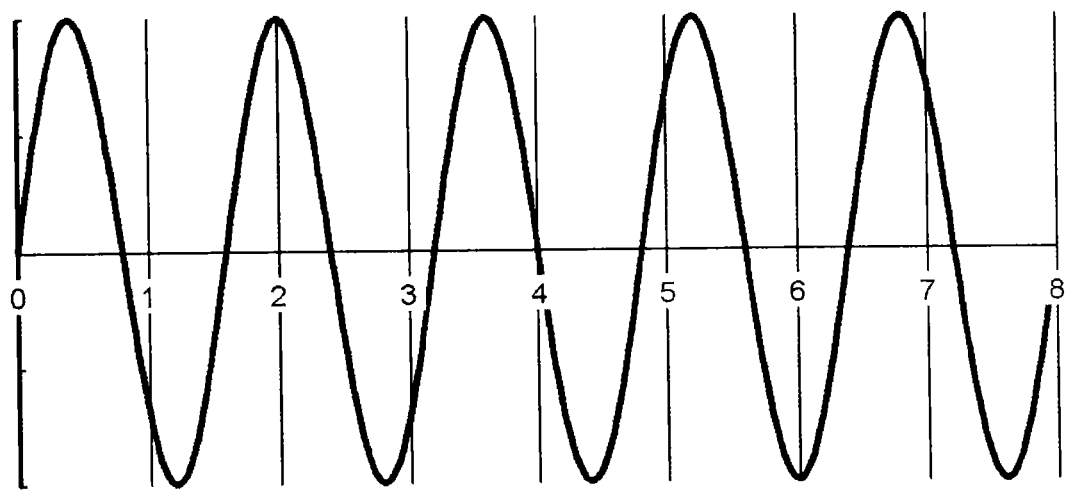
FIG. 14 is a diagram illustrating the symbol in the time domain when a subcarrier number 5 is used.
Figure 15:
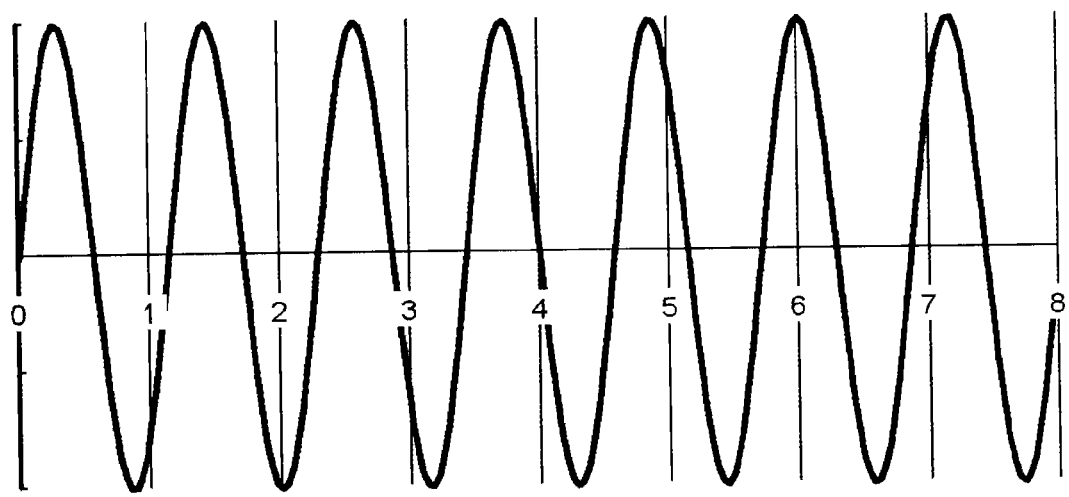
FIG. 15 is a diagram illustrating the symbols in the time domain when a subcarrier number 7 is used.

The sample subtracting unit 113 extracts only a specific sample in the symbol determined by the subcarrier set. Details of an extracting method of a sample are explained below. In this embodiment, first, third, fifth, and seventh subcarriers are defined as the subcarrier set selected out of the eight subcarriers. In each symbol, a signal component is present only in one subcarrier. Therefore, a time domain waveform is a sine wave, the frequency of which is determined by the number of subcarriers in use. This state is illustrated in FIG. 12 to FIG. 15. FIG. 12 is a diagram illustrating a symbol in the time domain when a subcarrier number 1 is used. FIG. 13 is a diagram illustrating the symbol in the time domain when a subcarrier number 3 is used. FIG. 14 is a diagram illustrating the symbol in the time domain when a subcarrier number 5 is used. FIG. 15 is a diagram illustrating the symbols in the time domain when a subcarrier number 7 is used. In FIGS. 12 to 15, the abscissa indicates a sample number in the symbol. It is seen from FIGS. 12 to 15 that a zero-th sample and a fourth sample take the same phase irrespective of the selected subcarrier number. In this way, the sample subtracting unit 113 extracts only samples (the zero-th sample and the fourth sample), which take a common phase irrespective of the subcarrier number.

After performing the extraction of the samples that hold the common phase irrespective of the subcarrier number explained above, the sample subtracting unit 113 directly accumulates a signal when an initial data symbol in the frame is processed. When a second data symbol is processed, the sample subtracting unit 113 extracts a sample in the same sample position as the initial data symbol; calculates a difference in the same sample position between the sample and the sample extracted from the accumulated initial data symbol; and outputs the result of the calculation to the sample-power calculating unit 114. As explained above, only the samples that hold the same phase between the symbols are extracted and the difference calculation then performed. Therefore, only noise components remain in a differential result. When processing the second and subsequent data symbols, the sample subtracting unit 113 accumulates extracted samples such that the difference calculation can be continuously performed when the next data symbol is processed.

After calculating a power value for each sample with respect to a signal input from the sample subtracting unit 113, the sample-power calculating unit 114 calculates a sum for the symbol. The sample subtracting unit 113 extracts only the samples that satisfy the condition explained above. Therefore, the calculation of the sum of power values in the sample-power calculating unit 114 is also processing for adding up power values for the number of extracted samples. Finally, the sample-power calculating unit 114 performs a correction such that the result of the calculation of the sum of power values is a value equivalent to power values of all the samples. Specifically, the sample-power calculating unit 114 performs processing for, after multiplying the result of the calculation of the sum of power values by the number of all the samples in the symbol, dividing the multiplied number by the number of extracted samples.

The selector 111 is configured to be capable of receiving signals from the first power calculating unit 41 and the sample-power calculating unit 114. The selector 111 switches a signal route to output an input from the first power calculating unit 41 to the first averaging processing unit 42 when the pilot symbol is processed; and then it outputs the input from the sample-power calculating unit 114 to the first averaging processing unit 42 when the data symbol is processed.

After averaging the signal input from the selector 111 between the symbols, the first averaging processing unit 42 outputs the signal to the power-ratio calculating unit 45.

The second power calculating unit 43 and the second averaging processing unit 44 perform processing equivalent to the processing in the first embodiment (see FIG. 4). Note that an input to the second power calculating unit 43 is a symbol in the time domain unlike the first embodiment. However, the second power calculating unit 43 can perform the same calculation by, after calculating a power value for each sample, calculating a sum for one symbol. Further, in this embodiment, unlike the first embodiment, a data symbol is also input to the second power calculating unit 43. However, there is no particular difference in processing content between the pilot symbol and the data symbol. The second averaging processing unit 44 outputs an averaged power value per one symbol to the power-ratio calculating unit 45.

The power-ratio calculating unit 45 performs processing that is the same as the processing in the first embodiment to calculate an SNR and outputs the SNR to the data demodulating unit 25.

As explained above, in this embodiment, the subcarriers that can be used for the signal transmission are defined as the subcarrier set. The transmitter is configured to transmit a signal using one subcarrier out of the subcarrier set such that samples that take the same phase between different symbols appear. Further, in the receiver, the communication-line-quality estimating unit 100 is configured to extract samples that take the same phase and perform the difference calculation between the extracted samples to estimate noise components. Consequently, it is possible to obtain an effect whereby the communication line quality estimation can be carried out in a data symbol section in addition to the known pilot symbol section and the communication line quality estimation accuracy is improved.

Note that, in this embodiment, the subcarrier set is defined to transmit a signal in which samples that take the same phase between symbols appear. In each sample, one subcarrier is selected out of the subcarrier set and transmitted. However, not only this, but any transmission method can be applied as long as the same phase appears in the same sample position between transmission symbols.

In this embodiment, the same phase appears in the same sample position between the transmission symbols. However, the samples do not always need to take the same phase. A signal in which a known fixed phase difference appears between the transmission symbols can be transmitted. In this case, the communication-line-quality estimating unit 100 multiplies one sample by a phase rotation that can cancel out the fixed phase difference and then subtracts the sample from the other sample rather than calculating a difference for the samples between the transmission symbols. Consequently, it is possible to obtain the communication line quality estimation. The same effect can be obtained by multiplying one sample by a phase rotation that changes phases of the samples to opposite phases and then adding up the samples.

In this embodiment, the signal is transmitted in the same subcarrier in the pilot symbols. However, the subcarriers for transmission can be changed among the pilot symbols. In that case, the communication-line-quality estimating unit 100 only has to be configured to always estimate noise power using the sample subtracting unit 113 and the sample-power calculating unit 114, irrespective of symbol timing. The change of the subcarriers between the pilot symbols is considered to be effective as, for example, a frequency selectivity fading measure and can be applied to such a system. The number of pilot symbols is not limited to two and can be any number equal to or larger than two. In this case, it is desirable that the pilot subtracting unit 112 is configured to be capable of accumulating, in processing the second and subsequent pilot symbols, signals as in the case of the first pilot symbol and performing the difference calculation between the pilot symbols and the next pilot symbols, in addition to the subtraction processing between the pilot symbols.

In this embodiment, the same subcarrier set is defined by taking into consideration both the pilot symbol and the data symbol. However, the subcarrier set can be defined using different subcarriers in the pilot symbol and the data symbol; or the pilot symbol can use all the subcarriers as in the first to third embodiments, and the subcarrier set can be defined only for the data symbol as in this embodiment. With such a configuration, it is possible to increase resistance to the frequency selectivity fading or the like and realize communication quality improvement.

Further, in this embodiment, the sample-power calculating unit 114 performs the processing of converting the power value of the extracted sample into the power value of all the samples. However, the sample-power calculating unit 114 can be configured to perform averaging of the power value of the extracted sample, and the power-ratio calculating unit 45 can be configured to finally convert the power value of the extracted sample into the power value of all the samples and then calculate the SNR. In this case, correction is performed only once for a power estimation value for which the averaging is completed. Therefore, it is possible to obtain an accurate communication line quality estimation result with variation of an estimation value reduced.

Fifth Embodiment

In this embodiment, communication line quality estimation is carried out using a signal obtained by removing waveform distortion from a reception signal. Parts that are different from the third and fourth embodiments are explained.

Figure 16:
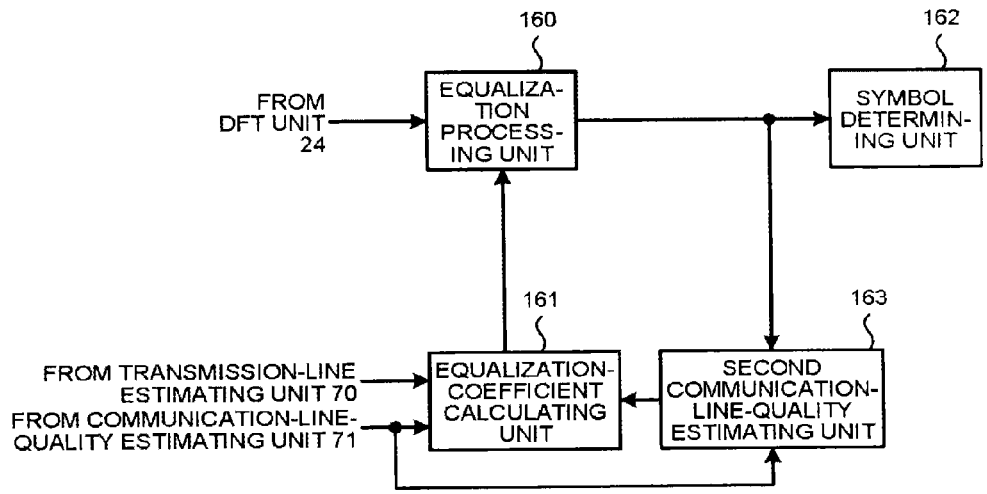
FIG. 16 is a diagram illustrating a configuration example of a data demodulating unit in a fifth embodiment.

The frame format in this embodiment is the frame format illustrated in FIG. 9 and is used as in the fourth embodiment. The overall configuration of a receiver is the same as the overall configuration illustrated in FIG. 7 in the third embodiment. However, the receiver includes a second communication-line-quality estimating unit on the inside of the data demodulating unit 25. FIG. 16 is a diagram illustrating a configuration example of the data demodulating unit 25 in this embodiment. In this embodiment, the data demodulating unit 25 includes an equalization processing unit 160, an equalization-coefficient calculating unit 161, a symbol determining unit 162, and a second communication-line-quality estimating unit 163.

The operation of the data demodulating unit 25 in this embodiment is explained here. In the data demodulating unit 25 illustrated in FIG. 16, a reception signal in a frequency domain is input to the equalization processing unit 160 from the DFT unit 24 illustrated in FIG. 7. A transmission line estimation result is input to the equalization-coefficient calculating unit 161 from the transmission-line estimating unit 70. A communication line quality estimation value is input to the equalization-coefficient calculating unit 161 from the communication-line-quality estimating unit 71. A communication line quality estimation value is input to the second communication-line-quality estimating unit 163 from the communication-line-quality estimating unit 71.

When a data symbol is processed, the equalization processing unit 160 multiplies the reception signal in the frequency domain by an equalization coefficient input from the equalization-coefficient calculating unit 161 for each subcarrier and compensates for signal distortion. The equalization processing unit 160 outputs the data symbol with the signal distortion compensated, which is a processing result, to the symbol determining unit 162 and the second communication-line-quality estimating unit 163.

The symbol determining unit 162 performs, using the data symbol with the signal distortion compensated input from the equalization processing unit 160, determination of an information signal transmitted by the transmitter.

When a pilot symbol is processed, the equalization-coefficient calculating unit 161 calculates, using the transmission line estimation result input from the transmission-line estimating unit 70 and the communication line quality estimation value input from the communication-line-quality estimating unit 71, for each subcarrier, an equalization coefficient for compensating for signal distortion received by the reception signal. Any method can be used as a calculation method of the equalization coefficient. For example, an algorithm based on an MMSE (Minimum Mean Square Error) standard is widely used by those skilled in the art. Note that the equalization-coefficient calculating unit 161 is configured to receive the communication line quality estimation value from the second communication-line-quality estimating unit 163 as well. However, when the pilot symbol is processed, the equalization-coefficient calculating unit 161 does not use the communication line quality estimation value. When the data symbol is processed, the equalization-coefficient calculating unit 161 calculates an equalization coefficient for each subcarrier using the transmission line estimation result that is input from the transmission-line estimating unit 70 and the communication line quality estimation value that is estimated by the second communication-line-quality estimating unit 163 according to processing explained below; and the equalization-coefficient calculating unit 161 then outputs the equalization coefficients to the equalization processing unit 160.

Figure 17:
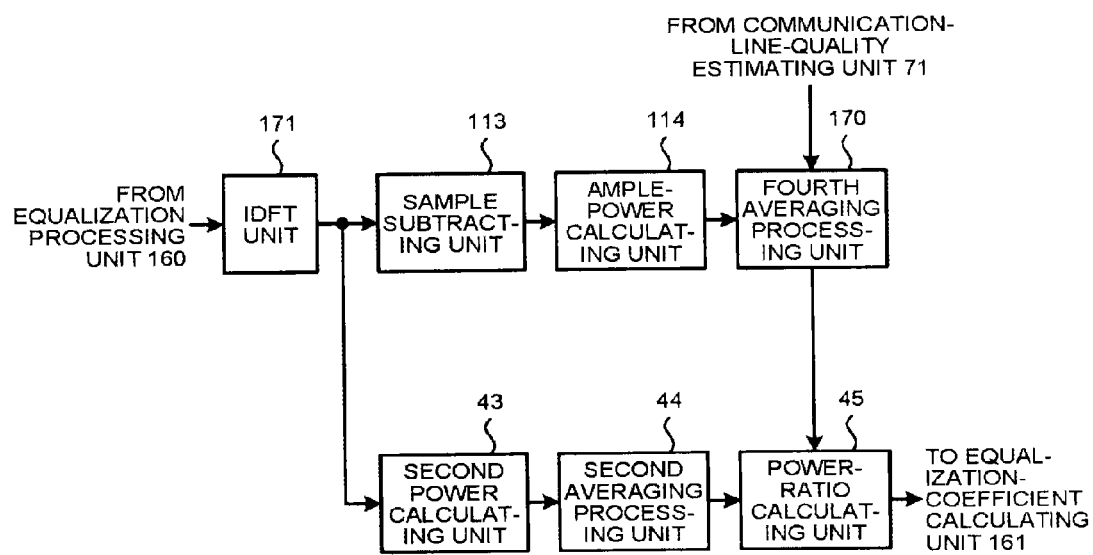
FIG. 17 is a diagram illustrating a configuration example of a second communication-line-quality estimating unit in the fifth embodiment.

FIG. 17 is a diagram illustrating a configuration example of the second communication-line-quality estimating unit 163 in this embodiment. The second communication-line-quality estimating unit 163 includes the second power calculating unit 43, the second averaging processing unit 44, the power-ratio calculating unit 45, the sample subtracting unit 113, the sample-power calculating unit 114, a fourth averaging processing unit 170, and an IDFT unit 171. In the second communication-line-quality estimating unit 163, the selector 110, the pilot subtracting unit 112, the first power calculating unit 41, and the selector 111 are removed from the communication-line-quality estimating unit 100 in the fourth embodiment illustrated in FIG. 11. The second communication-line-quality estimating unit 163 includes the fourth averaging processing unit 170, the first averaging processing unit 42 being replaced, and it further includes the IDFT unit 171. Note that the sample subtracting unit 113, the sample-power calculating unit 114, and the fourth averaging processing unit 170 are configured as a first power-value calculating unit. The second power calculating unit 43 and the second averaging processing unit 44 are configured as a second power-value calculating unit.

The IDFT unit 171 is a converting unit that applies an inverse discrete Fourier transform to the data symbol with the signal distortion compensated that is transferred from the equalization processing unit 160, and it converts the data symbol into a time domain signal.

As in the fourth embodiment, the sample subtracting unit 113 extracts, from the time domain signal transferred from the IDFT unit 171, only a specific sample in a symbol determined from a subcarrier set. The sample subtracting unit 113 directly accumulates a signal when the initial data symbol in a frame is processed; extracts a sample in the same sample position as the initial data symbol when the second and subsequent data symbols are processed; calculates the difference in the sample positions between the sample and the sample extracted from the initial data symbol; and outputs the difference to the sample-power calculating unit 114. The sample subtracting unit 113 accumulates the extracted samples such that the differential calculation can be continuously performed when the next data symbol is processed.

The sample-power calculating unit 114 calculates a power value according to the processing that is the same as the processing in the fourth embodiment, and it outputs the power value to the fourth averaging processing unit 170.

The fourth averaging processing unit 170 performs a process to average the power value input from the sample-power calculating unit 114 using, as an initial value, the communication line quality estimation value input from the communication-line-quality estimating unit 71. For example, the averaging processing performed by using an IIR (Infinite Impulse Response) filter can be applied to this averaging processing. The fourth averaging processing unit 170 outputs an averaging result to the power-ratio calculating unit 45.

The second power calculating unit 43, the second averaging processing unit 44, and the power-ratio calculating unit 45 perform processing that is the same as the processing explained above. Finally the power-ratio calculating unit 45 outputs the communication line quality estimation result to the equalization-coefficient calculating unit 161.

As explained above, in this embodiment as in the fourth embodiment, the subcarriers that can be used for the signal transmission are defined as the subcarrier set. The communication line quality estimation can be configured to carry out in a data symbol section as well. In addition, the communication line quality estimation performed using the data symbol can be performed using the signal that has been compensated for the signal distortion included in the reception signal. Consequently, it is possible to obtain an effect that, even in an environment in which signal distortion is present, an accurate communication line quality estimation value is obtained and communication quality is improved. Because an update of the communication line quality estimation value can be performed in a data symbol section, the ability to follow on from fluctuation in the communication line quality is improved, and thus it is possible to maintain satisfactory communication regardless of the environment.

Note that, in this embodiment, the processing result in the second communication-line-quality estimating unit 163 is output only to the equalization-coefficient calculating unit 161. However, the present invention is not limited to this. For example, although not clearly indicated in this embodiment, it is known that, when error correction coding is applied, decoding performance is improved by performing a soft decision in a demodulating unit. The estimated communication line quality estimation value can be used for the calculation of the soft decision. To use the estimated communication line quality estimation value in the control of adaptive modulation or the like, the estimated communication line quality estimation value can be output to a circuit that controls modulation and demodulation.

INDUSTRIAL APPLICABILITY

As explained above, the communication line quality estimating apparatus according to the present invention is useful for radio communication and, in particular, suitable for digital radio communication.

REFERENCE SIGNS LIST

10 Data modulating unit
11 Known-signal generating unit
12 Frequency mapping unit
13, 171 IDFT units
14 CP adding unit
15 Frame generating unit
16 D/A-conversion processing unit
17 High-frequency processing unit
18 Transmission antenna
20 Reception antenna
21 High-frequency processing unit
22 A/D-conversion processing unit
23 CP removing unit
24 DFT unit 25 Data demodulating unit
26, 100 Communication-line-quality estimating units
40 Pilot adding unit
41 First power calculating unit
42 First averaging processing unit
43 Second power calculating unit
44 Second averaging processing unit
45 (First) Power-ratio calculating unit
60 Control unit
61 Threshold determining unit
70 Transmission-line estimating unit
71 Communication-line-quality estimating unit
80 Third power calculating unit
81 Third averaging processing unit
82 Second power-ratio calculating unit
83 Communication-line-quality-estimation-result output unit
110, 111 Selectors
112 Pilot subtracting unit
113 Sample subtracting unit
114 Sample-power calculating unit
160 Equalization processing unit
161 Equalization-coefficient calculating unit
162 Symbol determining unit
163 Second communication-line-quality estimating unit
170 Fourth averaging processing unit

The invention claimed is:

1. A communication-line-quality estimating apparatus of a receiver that receives at least two signals sent from a transmitter, the at least two signals having a known phase relation with each other, the communication-line-quality estimating apparatus comprising:
a first power-value calculating unit that cumulatively adds up and averages a power value of a noise component calculated from a specified combination of the signals having the known phase relation to produce a noise signal power value;
a second power-value calculating unit that cumulatively adds up and averages a power value of the signals to produce a reception signal power value;
a power-ratio calculating unit that estimates communication line quality using the noise signal power value input from the first power-value calculating unit and the reception signal power value input from the second power-value calculating unit; and
the receiver demodulates data received from the transmitter based on the communication line quality estimated by the power-ratio calculating unit.

2. The communication-line-quality estimating apparatus according to claim 1, wherein
the power-ratio calculating unit
subtracts the noise signal power value from the reception signal power value so as to calculate a desired signal power value and
estimates the communication line quality from a ratio of the desired signal power value to the noise signal power value.

3. The communication-line-quality estimating apparatus according to claim 1, wherein,
when the symbols in the specified combination of the signals includes a signal in anti-phase with another signal among the at least two signals, the first power-value calculating unit adds up the signals in the specified combination of the signals so as to calculate the power value of the noise component.

4. The communication-line-quality estimating apparatus according to claim 1, wherein,
when the combination of the signals is includes one signal and the another signal that are the same in a combination of two signals among the at least two signals, the first power-value calculating unit subtracts the signals in the combination of the signals so as to calculate the power value of the noise component.

5. The communication-line-quality estimating apparatus according to claim 1, wherein,
when the first power-value calculating unit calculates the power value of the noise component using a first combination of the signals, the communication-line-quality estimating apparatus further comprises:
a threshold determining unit that compares a communication line quality estimation result of the power-ratio calculating unit with a determination threshold and then determines whether to end or continue an operation of the communication line quality estimation; and
a control unit that controls, on the basis of the determination of the threshold determining unit, whether the signals of second and subsequent combinations are to be output to the first power-value calculating unit and the second power-value calculating unit.

6. The communication-line-quality estimating apparatus according to claim 1, wherein,
when the power-ratio calculating unit is a first power-ratio calculating unit, the communication-line-quality estimating apparatus further comprises:
a transmission-line estimating unit that estimates a response of a radio transmission line between the transmitter and the receiver necessary for data demodulation processing;
a third power-value calculating unit that cumulatively adds and averages a power value of a transmission line estimation result input from the transmission-line estimating unit;
a second power-ratio calculating unit that calculates a ratio of a reception signal power value input from the first power-value calculating unit to a transmission line estimation result power value input from the third power-value estimating unit; and
a communication-line-quality-estimation-result output unit that receives, as an input, an output value from the first power-ratio calculating unit and an output value from the second power-ratio calculating unit; estimates the communication line quality; and outputs a communication line quality estimation result.

7. The communication-line-quality estimating apparatus according to claim 6, wherein
the communication-line-quality-estimation-result output unit
compares either the output values from the first power-ratio calculating unit or the output value from the second power-ratio calculating unit with a selection threshold; and
outputs one of the output values as the communication line quality estimation result on the basis of the comparison result.

8. The communication-line-quality estimating apparatus according to claim 6, wherein
the communication-line-quality-estimation-result output unit outputs, as the communication line quality estimation result, a value obtained by combining the output value from the first power-ratio calculating unit and the output value from the second power-ratio calculating unit.

* * * * *